US008953876B2

(12) United States Patent
Lerios et al.

(10) Patent No.: US 8,953,876 B2
(45) Date of Patent: Feb. 10, 2015

(54) CREATION OF A COLOR PROFILE OF AN IMAGE

(75) Inventors: Apostolos Lerios, Austin, TX (US);
Ryan David Mack, Waltham, MA (US)

(73) Assignee: Facebook, Inc., Menlo Park, CA (US)

( * ) Notice: Subject to any disclaimer, the term of this patent is extended or adjusted under 35 U.S.C. 154(b) by 202 days.

(21) Appl. No.: 13/591,948

(22) Filed: Aug. 22, 2012

(65) Prior Publication Data

US 2014/0056512 A1  Feb. 27, 2014

(51) Int. Cl.
*G06K 9/00* (2006.01)
*G09G 5/02* (2006.01)
*G06T 3/00* (2006.01)
*H04N 1/60* (2006.01)
*H04N 1/54* (2006.01)

(52) U.S. Cl.
CPC ............... *G06T 3/00* (2013.01); *H04N 1/6058* (2013.01); *H04N 1/54* (2013.01)
USPC ......................................... 382/162; 345/604

(58) Field of Classification Search
CPC ..... G06T 11/001; G06T 7/408; G06T 7/0083; G06T 3/00; G09G 5/02; H04N 1/54; H04N 1/6058
USPC .......... 382/162, 276, 232; 345/597, 604, 649; 358/1.9
See application file for complete search history.

(56) References Cited

U.S. PATENT DOCUMENTS

| 7,647,348 | B2 * | 1/2010 | Stokes | 345/604 |
| 8,207,982 | B2 * | 6/2012 | Tin | 345/589 |
| 8,243,326 | B2 * | 8/2012 | Olson | 358/1.9 |
| 8,339,666 | B2 * | 12/2012 | Kaneko | 358/1.9 |
| 8,457,392 | B2 * | 6/2013 | Cavallaro et al. | 382/162 |
| 8,520,257 | B2 * | 8/2013 | Teraue | 358/1.9 |
| 8,619,349 | B2 * | 12/2013 | Kishino et al. | 358/518 |

* cited by examiner

*Primary Examiner* — Kanjibhai Patel
(74) *Attorney, Agent, or Firm* — Baker Botts L.L.P.

(57) ABSTRACT

Techniques for accurate color representation of images stored within a social networking system. In an embodiment, an error metric and a target error threshold are determined. A binary search algorithm and a simulated annealing algorithm are performed. A color profile for transforming an image in a first color space to a second color space is created based on the binary search algorithm, the simulated annealing algorithm, the error metric, and the target error threshold. Determination of the error metric may comprise determining a frequency with which a color occurs in the image, assigning a weight to the color based on the frequency, and calculating the error metric based on the weight. Determination of the error metric may comprise dividing the image into a plurality of sections, assigning a plurality of importance values to the plurality of sections, and calculating the error metric based on the plurality of importance values.

20 Claims, 11 Drawing Sheets

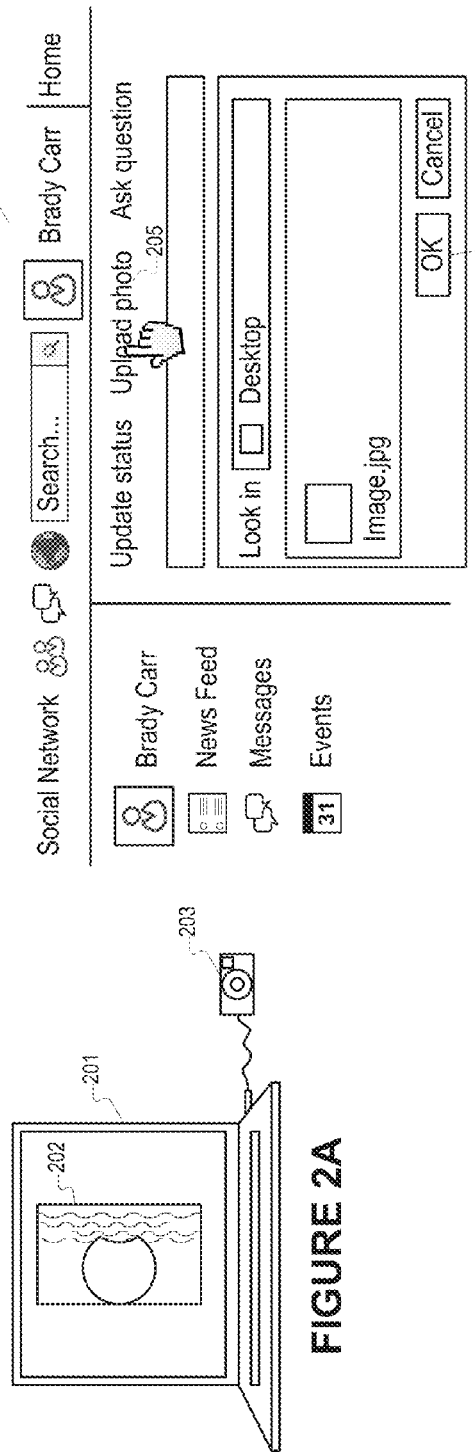
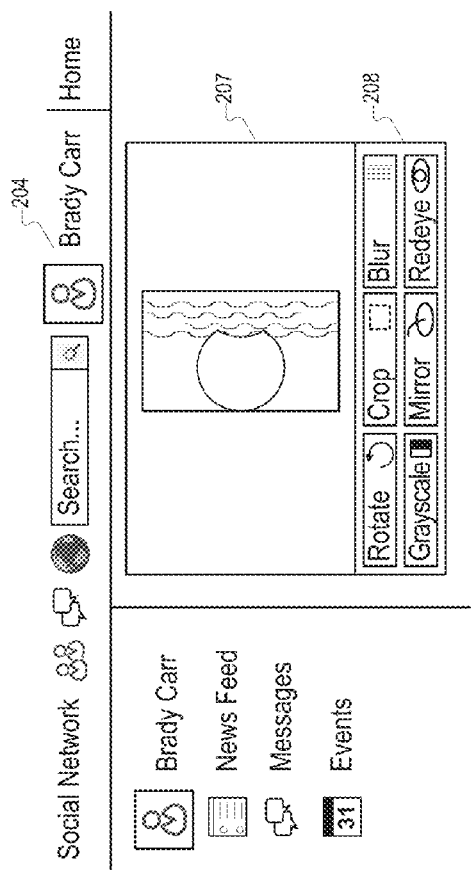

| Polyline N=3 | |
|---|---|
| x | y |
| Offset | 0 |
| 0.0000 | 0.0000 |
| 0.3333 | 0.1111 |
| 0.6667 | 0.4444 |
| 1.0000 | 1.0000 |

400

| Polyline N=3 | |
|---|---|
| x | y |
| Offset | 0.02 |
| 0.0000 | 0.0000 |
| 0.3333 | 0.0911 |
| 0.6667 | 0.4244 |
| 1.0000 | 1.0000 |

401

CREATION OF A COLOR PROFILE OF AN IMAGE

FIELD OF THE INVENTION

The present invention relates to the field of social networking. More particularly, the present invention provides a technique for facilitating accurate color representation of images stored within and delivered by a social networking system.

BACKGROUND

Internet social networks have become a significant phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Often, most information on a user's profile is only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. Because of their collaborative nature, social networks have now become the preferred means by which many people share photos and other media content.

In addition, as technology has evolved, tools have emerged for accessing social networks from a growing variety of technology platforms. Images uploaded to a social network may be accessed from a variety of different devices. In addition to the different capabilities and features of the devices that generate images, the devices that are used to access images uploaded to the social network may also have different capabilities and features for displaying images. Consequently, each device may render an image differently.

SUMMARY

To allow for accurate color representation of images stored within and delivered by a social networking system, embodiments of the invention include systems, methods, and computer readable media to facilitate transforming an image from a first color space to a second color space. An error metric and a target error threshold are determined. A binary search algorithm and a simulated annealing algorithm are performed. A color profile for transforming an image in a first color space to a second color space is created based on the binary search algorithm, the simulated annealing algorithm, the error metric, and the target error threshold.

In an embodiment, the color profile may comprise control points for a plurality of polylines and associated polyline segments. The plurality of polylines may each approximate one ideal function curve. A color profile may be associated with more than one curve, e.g., a curve for transforming the red color component, and another curve one for transforming the blue and green components. The plurality of control points of each polyline may lie on their associated the ideal function curve. Alternatively, the plurality of control points of each polyline may not lie on their associated ideal function curve.

In an embodiment, the determining the error metric may comprise calculating a numerical difference between an ideal color and an approximate color. In an embodiment, determination of the error metric may comprise calculating a Delta-E for an ideal color and an approximate color. In an embodiment, determination of the error metric may comprise computing the error metric based on at least one color. In an embodiment, determination of the error metric may comprise computing the error metric based on a plurality of colors. In an embodiment, the plurality of colors may be represented by consecutive bytes.

In an embodiment, the determining the error metric may comprise determining a frequency with which a color occurs in the image, assigning a weight to the color based on the frequency, and calculating the error metric based on the weight. Alternatively, the determining the error metric may comprise dividing the image into a plurality of sections, assigning a plurality of importance values to the plurality of sections, and calculating the error metric based on the plurality of importance values.

In an embodiment, the performing the binary search algorithm may comprise determining an upper bound and a lower bound for the binary search algorithm. The creating the color profile may comprise determining a plurality of polyline segments based on the error metric, the target error threshold, the binary search algorithm, and the simulated annealing algorithm. The creating the color profile may comprise omitting consideration of a color that does not appear in the image.

In an embodiment, the performing the simulated annealing algorithm may comprise determining coordinates for a plurality of polyline control points. The coordinates may be chosen so as to minimize a distance between a polyline and an ideal function curve. Alternately, the coordinates may be chosen so as to minimize the error, as determined by the error metric, across the overall color transformation effected by a color profile which contains the polyline relative to an ideal profile which contains the ideal function curve. The first color space may comprise at least one of an RGB color space and an XYZ color space.

Many other features and embodiments of the invention will be apparent from the accompanying drawings and from the following detailed description.

BRIEF DESCRIPTION OF THE DRAWINGS

FIG. 2A illustrates a user of a social networking system copying to his computer a photograph taken with his digital camera in accordance with an embodiment of the invention.

FIG. 2B illustrates the user accessing a user interface to upload the photograph to the social networking system in accordance with an embodiment of the invention.

FIG. 2C illustrates the photograph uploaded to the social networking system and displayed within a user interface in accordance with an embodiment of the invention.

Figure 1:
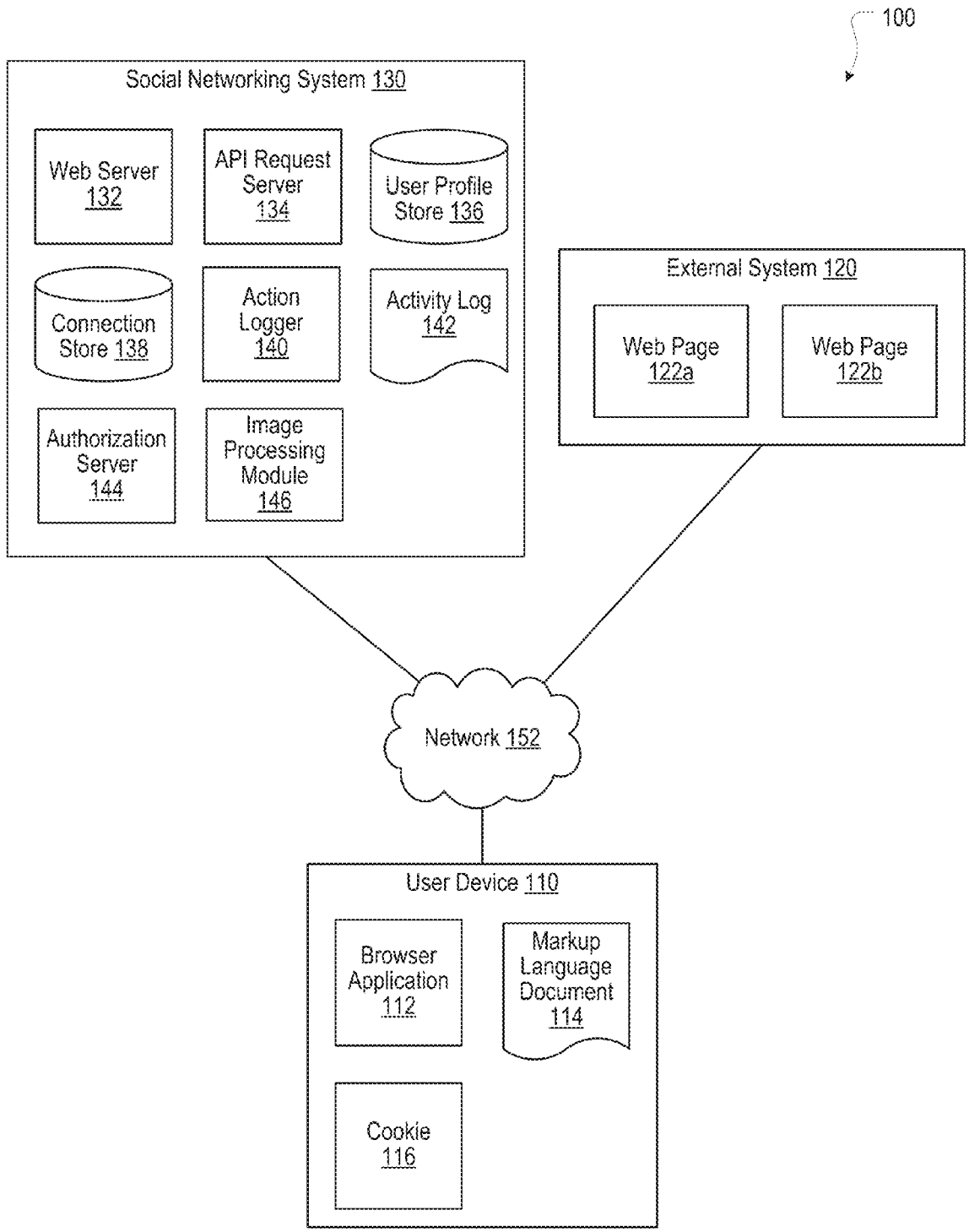
FIG. 1 illustrates a network diagram of a system for facilitating accurate color representation of images stored within a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for facilitating accurate color representation of images stored within a social networking system in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes a news feed rendering module 118.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include an image processing module 146. The image processing module 146 may be implemented as a single component or as multiple components. The image processing module 146 may analyze images provided to the social networking system 130 and create color profiles to facilitate transforming the images from one color space to another color space.

Lossy Image Compression

Users may take advantage of the collaborative features and functionality of the social networking system 130 to upload and share digital images. A user of the social networking system 130 may upload a profile picture that features prominently on her profile and identifies her to friends and other users. A user may also upload a cover image that may be displayed as a banner across the top of the user's profile. In addition to a profile picture and a cover image, a user may upload images to share with other users, such as photographs of an event, artwork, professional photography portfolios, photos from nature, or any other type of digital images.

Figure 2D:
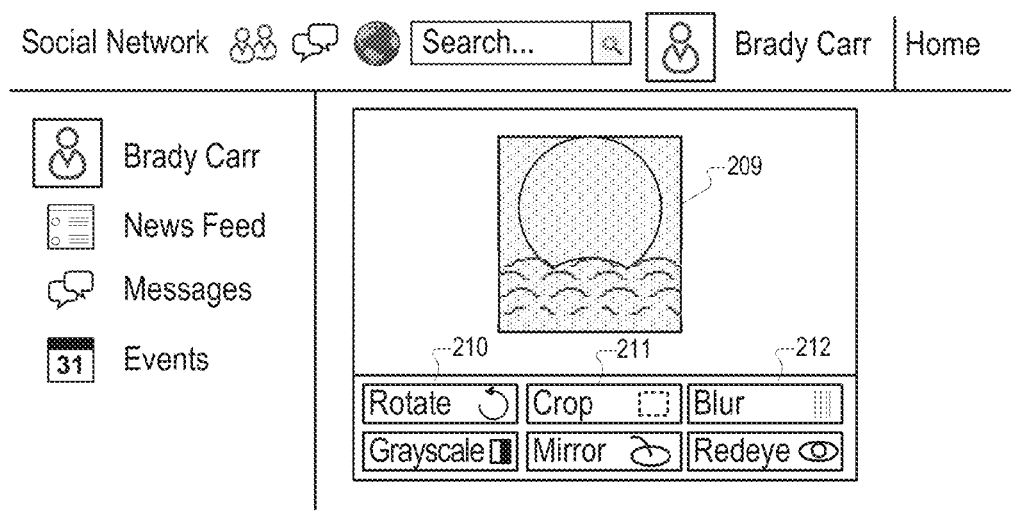
FIG. 2D illustrates the user applying a number of edits to the photograph, resulting in an altered photograph in accordance with an embodiment of the invention.

FIGS. 2A-2D illustrates online photo sharing functionality of the social networking system 130 in accordance with an embodiment of the invention. In FIG. 2A, user Brady Carr has copied to a computer 201a photograph 202 taken with a digital camera 203. In FIG. 2B, Brady Carr has accessed a user interface 204 to upload the photograph 202 to the social networking system 130. Brady Carr selects an 'upload' option 205 within the user interface 204 that prompts him to browse to the location of the photograph 202 on the local storage of the computer 201. He locates the photograph 202 and selects an 'OK' option 206. In FIG. 2C, the photograph 202 has been uploaded to the social networking system 130 and is displayed within the user interface 204. The user interface 204 in FIG. 2C includes a photo editing panel 207 with an options toolbar 208. In FIG. 2D, Brady Carr has applied a number of edits to the photograph 202, resulting in the altered photograph 209. These edits include a 90 degree rotation, indicated by a 'rotate' button 210, a crop, indicated by a 'crop' button 211, and a blur, indicated by a 'blur' button 212. Brady Carr may finalize and submit these edits by selecting the 'Save' option.

Digital images may be expressed within a color space. A color space refers to an abstract mathematical model for representing the colors that comprise an image. Color spaces help to ensure consistency in color representation across the potentially numerous different devices that may display a digital image. For example, the photograph 202 in FIGS. 2A-2D is created by the digital camera 203, copied to the computer 201, uploaded to the social networking system 130, and downloaded to a user device 110. The digital camera 203, the computer 201, the social networking system 130, and the user device 110 may each interpret the photograph 202 with reference to a color space.

A digital image comprises a series of pixels. According to some color spaces, each pixel may be represented as a triplet of numerical values. In one such family of color spaces, these values correspond to the levels of red (R), green (G), and blue (B) primary colors present in the pixel. Every color space in this family is known as the RGB color space. There are multiple RGB color spaces depending on exactly which shade or hue of red, green, and blue is used as the primary color for R, G, and B. In one implementation of an RGB color space, each of the RGB values may be expressed as an integer between 0 and 255, i.e., a byte. A value of 0 may correspond to the darkest shade of a primary color, whereas a value of 255 may correspond to the lightest shade. Thus, [0, 0, 0] corresponds to black, and [255, 255, 255] corresponds to white. An RGB color space may be conceptualized as a device-specific color space, since it defines color parameters that are unique to a particular device. Each device may use a unique shade of each of the red, blue, and green primaries.

Often, because different color spaces are best suited for different purposes, it may be necessary to transform an image from one color space to another color space. For example, the XYZ color space is among the most well-established and widely recognized color spaces in use today. The XYZ color space relies on visual stimulus values and color-matching functions to achieve a high degree of precision in expressing an image as perceived by the human eye. Unlike the RGB color space, the XYZ color space is an absolute color space. Absolute color spaces may express color without reference to external factors, such as the device-specific red, green, and blue primary colors of an RGB color space. To optimize the display of an image on a different device from the device on which it was created, it may be desirable to transform the image from a device-specific color space such as RGB to an absolute color space such as XYZ. Such color space transformations are facilitated by color profiles associated with digital images. A color profile provides a model for transforming an image from one color space to another color space. The color profile of an image file may represent the color space transformation between a color space unique to the image (e.g., specific to the device that generated the image) and some absolute color space.

Color profile files may take many forms. A common format for color profiles relies on standard specifications defined by the International Color Consortium, an industry organization that defines cross-platform color management standards. The standard specifications may use a tag-based file format to represent color space transformations. The tag-based format may include a profile header, a tag table, and tagged element data. The header is a fixed-length section structured in a format dictated by a standard specification. The header may contain information that every file formatted to comply with the standard specification is required to contain, e.g., version information. The tag table is a lookup table that specifies which portion of the tagged element data corresponds to particular fields and the offsets for each field. The specifications define the set of tags that may or must be present in a color profile, and also may impose some constraints on the contents of the tagged element data section.

Color profiles are normally transmitted with an image file or embedded within the image file (if the file supports embedded metadata). When the image needs to be rendered on a device (e.g., a printer or a monitor), a color management system may transform the image pixels to an absolute color space using the color profile of the image and further transform them from the absolute color space to a color space specific to the recipient device using a color profile unique to that device. However, when performed according to techniques available in the prior art, such color space transformations often consume excessive amounts of data or have high bandwidth requirements. If the social networking system 130 serves hundreds of millions of users who may share potentially billions of images, conventional techniques may be unwieldy and inefficient. To address these shortcomings, embodiments of the invention provide techniques that may facilitate significant reductions in data requirements and processing bandwidth for color profiles and color space transformations without sacrificing image quality.

A portion of a color space transformation may be expressed in the form of a transformation curve, while other portions may comprise additional curves, a matrix transformation, or other mathematical operations. A transformation curve models a mapping of a value to a corresponding value, both values being intermediate quantities in a larger, multi-part color space transformation. This mapping and the corresponding curve may be described by an ideal function. For example, a color space transformation may transform (R, G, B)=(0.5, 0.1, 0.5) to (X, Y, Z)=(0.003, 0.147, 0.003) by first applying the mapping described by the ideal function $b=a^2$ to each of R, G, and B separately, yielding (0.25, 0.01, 0.25), and then applying the following matrix transformation:

$$\begin{bmatrix} -0.3 & 0.3 & 0.3 \\ 0.3 & -0.3 & 0.3 \\ 0.3 & 0.3 & -0.3 \end{bmatrix}$$

The ideal function may be based on the technical capabilities of the device on which the image was created. For example, the ideal function pertaining to images captured using a digital camera may be determined by the designer of the digital camera and hard-coded into firmware of the digital camera at the time of manufacture.

Because standard specifications may not allow for the ideal function to be explicitly defined in a color profile, the function may need to be approximated. Curve optimization is the process of approximating the ideal function. According to one embodiment of the invention, curve optimization may be performed through the use of polylines. A polyline is a series of connected straight line segments that are chosen and arranged in such a way that they approximate a curve on a graph. According to one embodiment of the invention, the ideal function is plotted as a curve on the graph and the polyline segments approximate the ideal function curve. The polyline segments may be represented by their control points, which comprise x-y coordinate pairs. The control points may be specified in the color profile of a digital image. The error of a polyline approximation may refer to the difference between a point on a polyline segment and the corresponding point on the ideal function curve, said correspondence being defined by the two points having the same x-coordinate value. The number of line segments may be chosen to achieve an optimal balance between reducing the error and reducing the size of the color profile. The polyline segments may be restricted by standard specifications such that their x-coordinate values must be equidistant from each other.

Figures 3A, 3B:
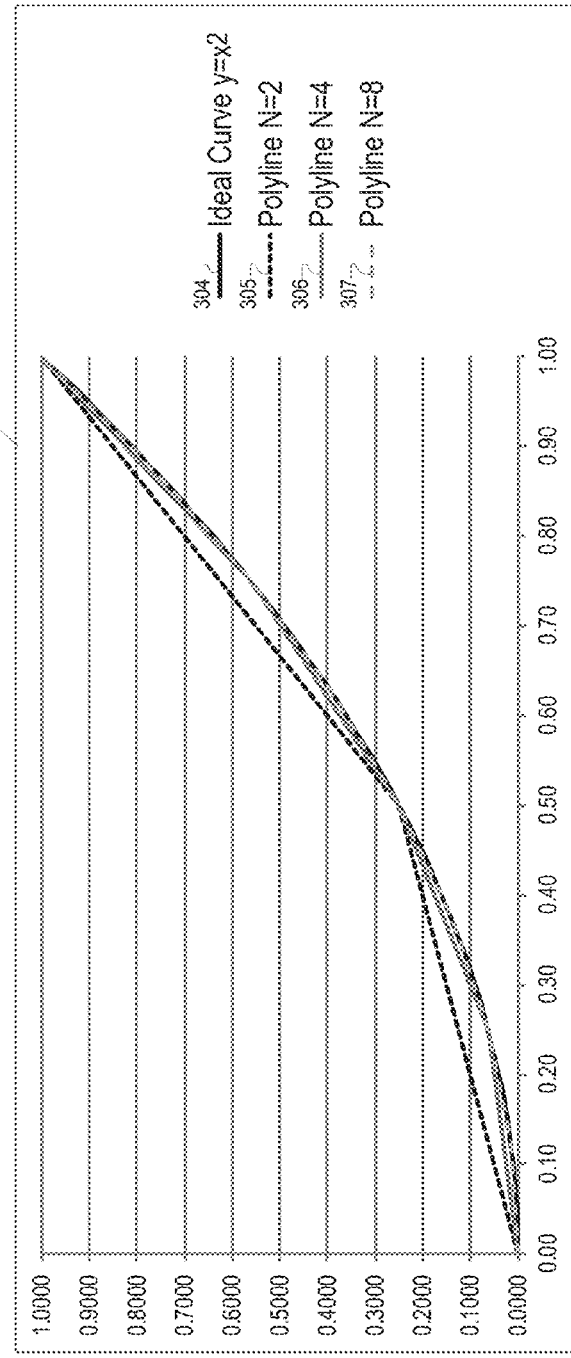
FIG. 3A illustrates tables of control points that represent polyline approximations of an ideal function in accordance with an embodiment of the invention.
FIG. 3B illustrates a graph of an ideal function curve and the polyline approximations of the ideal function in accordance with an embodiment of the invention.

FIGS. 3A-3B illustrate tables 300, 301, and 302 of polyline control points and a graph 303, respectively, of an ideal function and polylines that approximate the ideal function in accordance with an embodiment of the invention. Each of the x-y coordinate values is between 0 and 1. In the illustrated example, the ideal function is $y=x^2$, which is represented by an ideal function curve 304. As shown in the tables 300, 301, and 302 of FIG. 3A and the polylines 305, 306, and 307 of FIG. 3B, the polyline segments have been chosen such that the x-coordinate values of their control points are equidistant from each other. When the number of polyline segments N is 2 for the polyline 305, the x coordinates of the N+1=3 control points are 0.00, 0.50, and 1.00. When the number of polyline segments N is 4 for the polyline 306, the x coordinates of the N+1=5 control points are 0.0000, 0.2500, 0.5000, 0.7500, and 1.0000. When the number of polyline segments N is 8 for a polyline 307, the x coordinates of the N+1=9 control points are 0.000, 0.125, 0.250, 0.375, 0.500, 0.625, 0.750, 0.875, and 1.000. The error in the polyline approximation of the ideal function may be represented by the distance between a point on the curve representing the ideal function and the corresponding point on the polyline. As shown in the graph 303 of FIG. 3B, the greater the number of polyline segments, the smaller the error. For example, though the distance between the points on the polyline 307 and the points on the ideal curve 304 is minimal, the distance between the points on the polyline 305 and the points on the ideal curve 304 is more significant and noticeable.

Figures 4A, 4B:
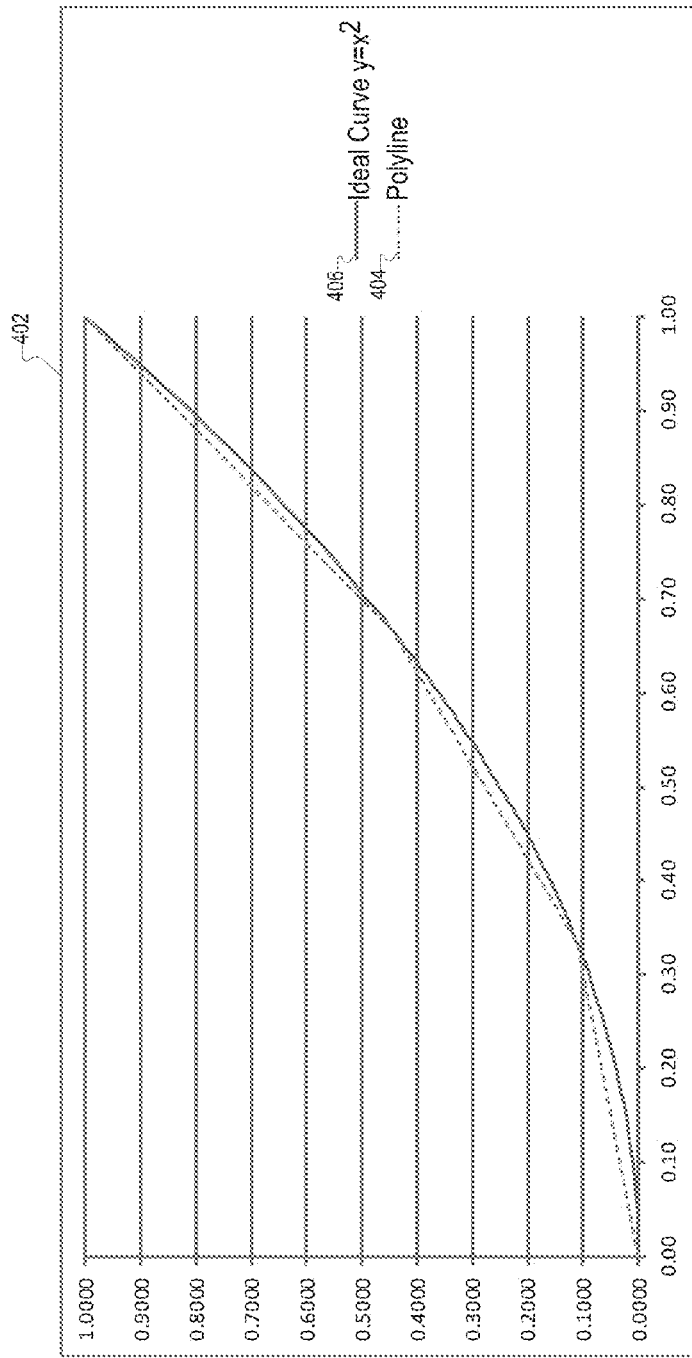
FIG. 4A illustrates tables of control points that represent polyline approximations with offset values in accordance with an embodiment of the invention.
FIG. 4B illustrates a graph of the ideal function curve and a polyline approximation of the ideal function with no offset in accordance with an embodiment of the invention.
Figure 4C:
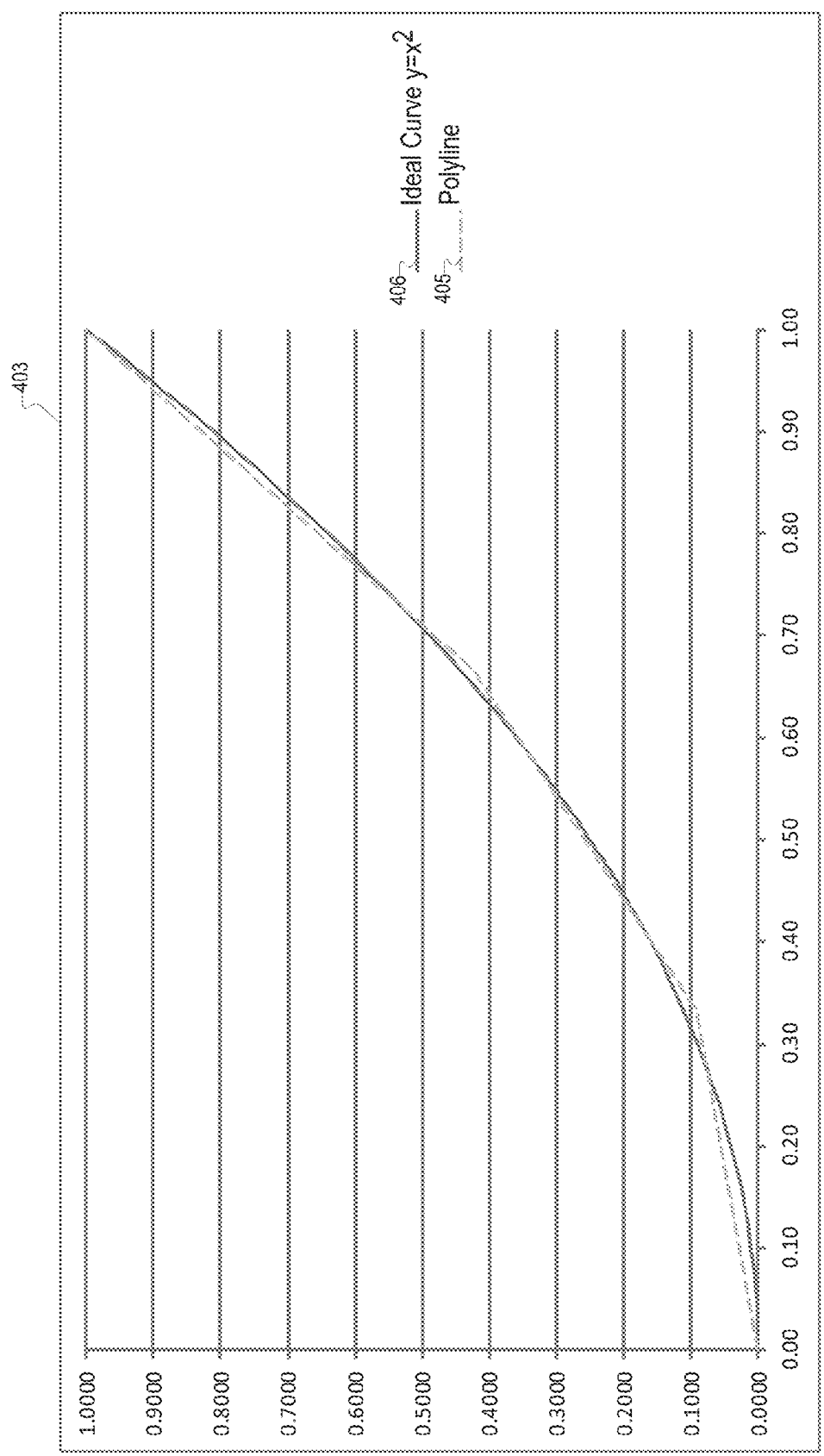
FIG. 4C illustrates a graph of the ideal function curve and a polyline approximation of the ideal function with a downwards offset of 0.02 in accordance with an embodiment of the invention.

In the example illustrated in FIGS. 3A-3B, the control points of the polyline segments lie on the ideal function curve 304. However, according to one embodiment of the invention, the y-coordinate values may be offset such that the control points may lie above or below the ideal function curve 304 and the polyline segments may intersect the ideal function curve 304. FIGS. 4A-4C illustrate tables 400 and 401 of polyline control points and their corresponding polylines 404 and 405, respectively, having three polyline segments. In the table 400 of FIG. 4A, the y coordinates have zero offset. As illustrated in the graph 402 of FIG. 4B, the control points of the polyline 404 lie on an ideal function curve 406 and the polyline segments of the polyline 404 run above the ideal function curve 406.

In the table 401, the y coordinates of the control points are offset from the ideal curve by the same amount 0.02. In an embodiment, the offset may be different for each control point. As illustrated in the graph 403 of FIG. 4C, the control points of the polyline 405 lie below the ideal function curve 406 and the polyline segments of the polyline 405 intersect the ideal function curve 406. Changing the y offset also changes the distance between points on the ideal function curve and corresponding points on a polyline. Thus, even though they both comprise three polyline segments, the polyline 404 in the graph 402 contains more error than the polyline 405 in the graph 403. According to one embodiment of the invention, curve optimization is aimed at determining a number of polyline segments and the coordinates of their control points that minimize the distance between the polyline and the ideal function curve, as further described further below.

According to one embodiment of the invention, the curve optimization technique by which the polyline segments and the offset are determined may be performed using a target error threshold, a binary search algorithm, and a simulated annealing algorithm. A target error threshold corresponds to a maximum allowable error in an approximation. A binary search algorithm is an iterative technique for determining an optimal value within an open or closed set of values. A simulated annealing algorithm is a probabilistic model for determining an optimal value to minimize a given function.

According to one embodiment of the invention, the target error threshold represents a value against which the error in a polyline-based approximation of a color profile may be compared. In an embodiment, the error may be equivalent to the polyline approximation error outlined above. In another embodiment, because transformation curves may represent only part of the overall color transformation effected by a color profile, a more accurate error calculation may rely on the overall transformation. The error may be numerically represented by the difference between an ideal color profile $C_I$ and an approximate color profile $C_P$. For example, if $P_I$ represents a color transformed by the ideal color profile $C_I$ and $P_P$ represents the corresponding approximate color transformed by the approximate color profile $C_P$, then according to one embodiment of the invention, the error value for each color may be represented by $|P_I-P_P|$, the magnitude of the difference between two 3-dimensional vectors. According to another embodiment of the invention, the error value for each color may be determined as the Delta-E of the colors $P_I$ and $P_P$. Delta-E is a standard measure of the difference between two colors developed by the International Commission on Illumination. Delta-E involves a measure of how perceptible the difference between two colors is by the human eye. Any other technique for computing the error value may be used. The error values for individual colors may be combined into an aggregate error value for the approximate color profile $C_P$ using an error metric formula, such as a plain, unweighted average. Any error metric may be used. The target error threshold against which an aggregate error value is compared may be fixed, variable, or determined by an algorithmic technique.

The binary search algorithm may be used for estimating the number of polyline segments to be included in a color profile. According to one embodiment, an upper bound and a lower bound for the binary search algorithm may be determined. The upper bound and lower bound may correspond to a maximum and minimum number of polyline segments, respectively. The upper and lower bounds may be fixed, determined manually, constrained by the color profile file format, or determined using an algorithmic technique.

The simulated annealing algorithm may be used to minimize error for a given number of polyline segments by determining the optimal control points for the polyline. The simulated annealing algorithm may determine the y-coordinates of the control points that result in the smallest distance between the polyline and the ideal function curve, as illustrated in FIGS. 4A-4C. According to one embodiment of the invention, the simulated annealing algorithm may be iteratively executed for different numbers of polyline segments between the upper and lower bounds until a minimum number of segments that results in an error value no greater than the target error threshold is determined. This minimum number of polyline segments and their accompanying control points may be used to create the color profile.

Figure 5:
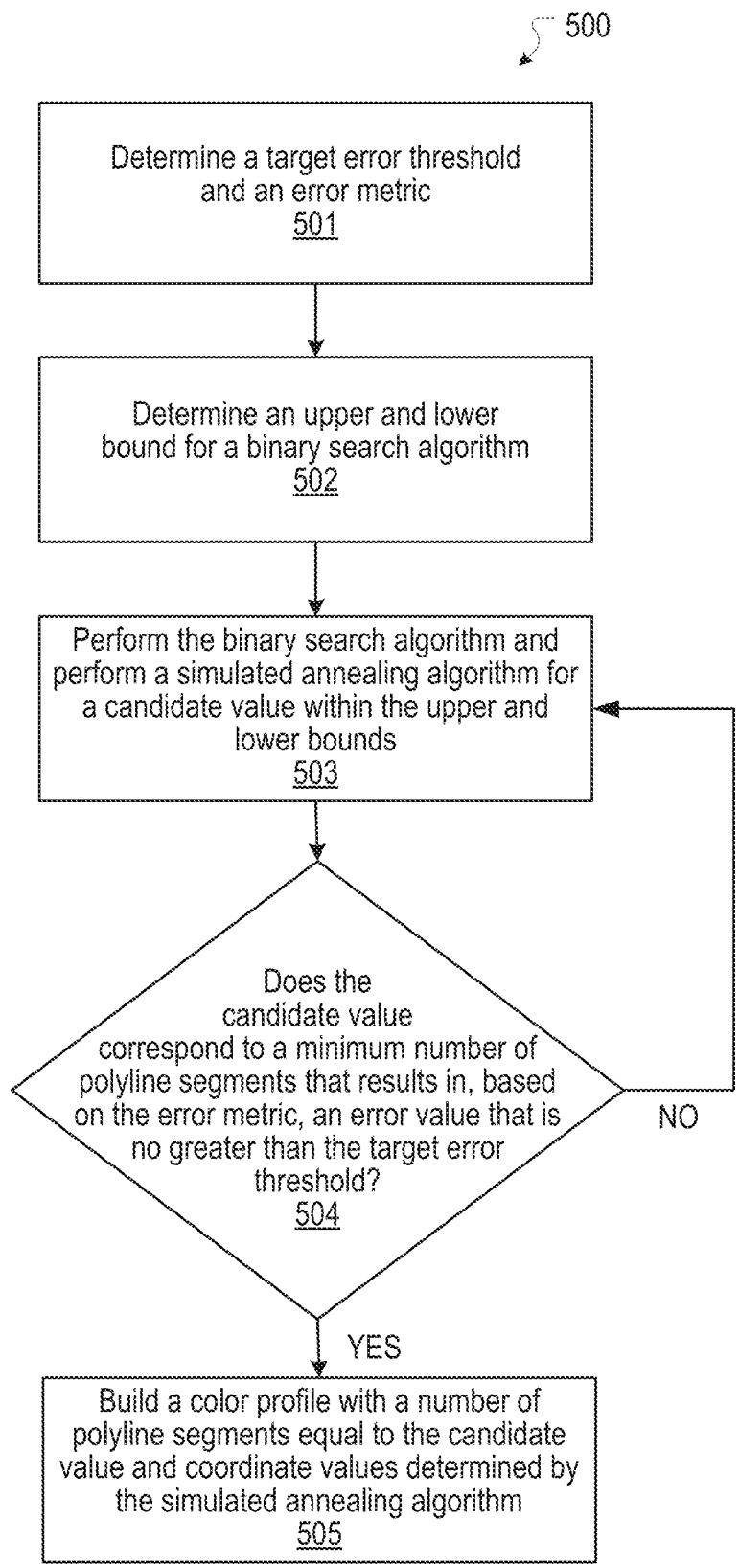
FIG. 5 illustrates a process for optimizing a color transformation curve in accordance with an embodiment of the invention.

FIG. 5 illustrates a process 500 for optimizing a color transformation curve for an image in accordance with an embodiment of the invention. At block 501, the social networking system 130 determines a target error threshold and an error metric. The target error threshold may be fixed, determined manually, or determined using an algorithmic technique. At block 502, the social networking system 130 determines an upper and lower bound for a binary search function. Similar to the target error threshold, the upper and lower bounds may be fixed, determined manually, constrained by the color profile file format, or determined using an algorithmic technique. At block 503, the social networking system 130 iterates the binary search algorithm by executing a simulated annealing model for a candidate value between the upper and lower bounds. The initial candidate value may be equal to the upper bound, the lower bound, or any value in between. Any technique for selecting an initial candidate value for the simulated annealing model may be used. At block 504, the social networking system 130 determines, based on the error metric, whether the candidate value corresponds to a minimum number of polyline segments that results in an error value no greater than the target error threshold. If the candidate value corresponds to a minimum number of polyline segments that results in an error value no greater than the target error threshold, then at block 505, the social networking system 130 builds a color profile with a number of polyline segments equal to the candidate value and the coordinate values determined by the simulated annealing algorithm. If the candidate value does not correspond to a minimum number of polyline segments that results in an error value no greater than the target error threshold, then the process 500 returns to block 503 and re-iterates using the principles of binary search. According to an embodiment, the process 500 may be entirely or partially performed by the image processing module 146 or other modules of the social networking system 130.

According to an embodiment, an iteration of the process 500 may be performed based on a binary search algorithm. According to the binary search algorithm, if a candidate value C, which was between lower bound L and upper bound U, results, after the execution of a simulated annealing model, in an error that was at or below the target error threshold, then the next iteration will use a new upper bound $C_1$ and new lower bound $L_1$. Otherwise, if the error exceeds the target error threshold, then the new lower bound is C and the new upper bound is U. Thus, the binary search invariant for every iteration may be stated as follows: at the lower bound, the error will be above the target error threshold and at the upper bound, the error will be at or below the target error threshold. Successive iterations maintain this invariant until the two bounds are very close, at which point the upper bound is the sought error value. The error at that value is at or below the threshold (per the invariant) but as soon as the number of segments is reduced slightly and hits the lower bound, the error exceeds the target error threshold (per the invariant). Hence, the upper bound corresponds to the minimum number of segments that results in an error value no smaller than the target error threshold.

According to one embodiment of the invention, the process 500 may aggregate the errors of individual pixels to compute the error in a color profile using a simple average of the individual errors. According to another embodiment, the aggregation may use a weighted average of the individual errors, where the weights may vary depending on the pixel color. For example, in a color space in which each pixel is represented as a triplet of values between 0 and 255, the process 500 may utilize the same weight for all $256^3=16,777,216$ colors within the color space. However, in many images, some colors may appear more frequently than others. For such images, using the same weight for every color within the color space may not result in a color profile optimal to those images. Thus, according to another embodiment of the invention, the determination of the weights may be biased in favor of colors that occur frequently within the image. In this embodiment, the social networking system 130 may analyze an image and determine the distribution of colors within the image prior to building a color profile for the image. The weight for each color may be determined as a value that is proportional to the occurrence of the color within the image. According to one embodiment, these weights may be determined by calculating a statistical distribution of all possible colors within the image and assigning a weight to each color corresponding to the frequency with which the color occurs within the image. In this embodiment, each $|P_I-P_P|$ or Delta-E of $P_I$ and $P_P$ may be weighted using the weight representing the color corresponding to $P_I$ and $P_P$.

Figure 6:
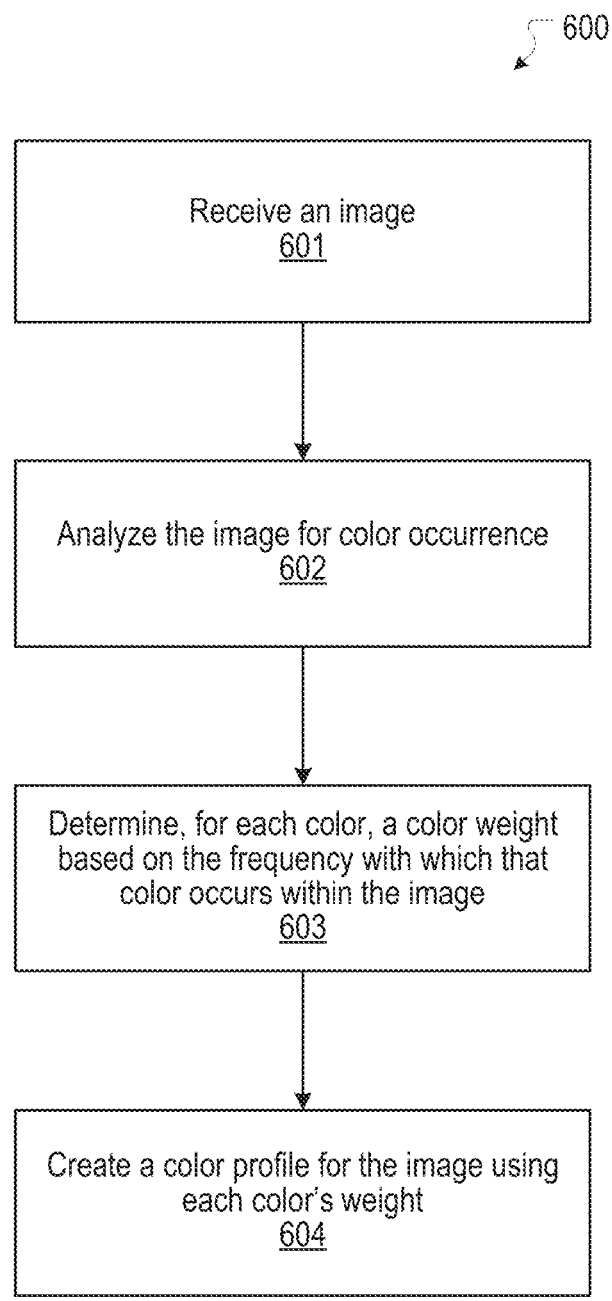
FIG. 6 illustrates a process for determining a color weight according to the occurrence of a color within an image in accordance with an embodiment of the invention.

FIG. 6 illustrates a process 600 for determining color weights based on the frequency with which a color occurs within an image in accordance with an embodiment of the invention. At block 601, the social networking system 130 receives an image. At block 602, the social networking system 130 analyzes the image for color frequency. According to one embodiment, the social networking system 130 may count the occurrences of each color of a color space within the image. Any technique for determining color frequency may be used. At block 603, for each color, the social networking system 130 determines a color weight based on the frequency with which the color occurs within the image. Any technique for determining or modeling the weights may be used. At block 604, the social networking system 130 creates the color profile for the image using each color's weight as determined in block 603. According to one embodiment, the color profile may include control points of polyline segments that may be determined using the binary search and simulated annealing techniques described herein. Any technique for creating the color profile or determining the polyline segments may be used. According to an embodiment, the process 600 may be entirely or partially performed by the image processing module 146 or other modules of the social networking system 130.

The processes 500 and 600 facilitate a high degree of precision in optimizing a color transformation curve, and the resulting color profile may represent a very accurate approximation of a color space transformation. However, the process 600 may be further adapted for environments in which computing resources are limited. The operator of a social networking system 130 with hundreds of millions of users uploading potentially millions of images a day may wish to streamline the computing processes of the social networking system 130. Nonetheless, the operator of the social networking system 130 may still wish to retain some degree of image-specific customization in color profiles. According to one embodiment of the invention, both of these goals may be facilitated by using image classes. Image classes refer to categories that images may be classified within according to their color content. For example, images that predominantly include shades of blue may be classified into a blue image class. Instead of computing an image profile for every image, the social networking system 130 may classify the image into a particular image class based on the color characteristics of the image and assign the image a color profile corresponding to that image class.

According to one embodiment of the invention, the social networking system 130 may quantify the color distribution within an image by calculating a histogram of the image. An image histogram is a graphical representation of the tonal distribution within an image. Image classes may be associated with histogram values in particular ranges, and an image may be classified into a particular class based on its histogram. According to one embodiment, the social networking system 130 may determine the image classes in advance during a pre-processing procedure in which the social networking system 130 analyzes existing images, classifies them according to color content, and builds a color profile based on the aggregate characteristics of the images in each class. The image classes and their associated profiles may be continuously updated as the social networking system 130 receives image data. The social networking system 130 may use the color profile associated with an image class as the color profile for an image within the class.

Figure 7:
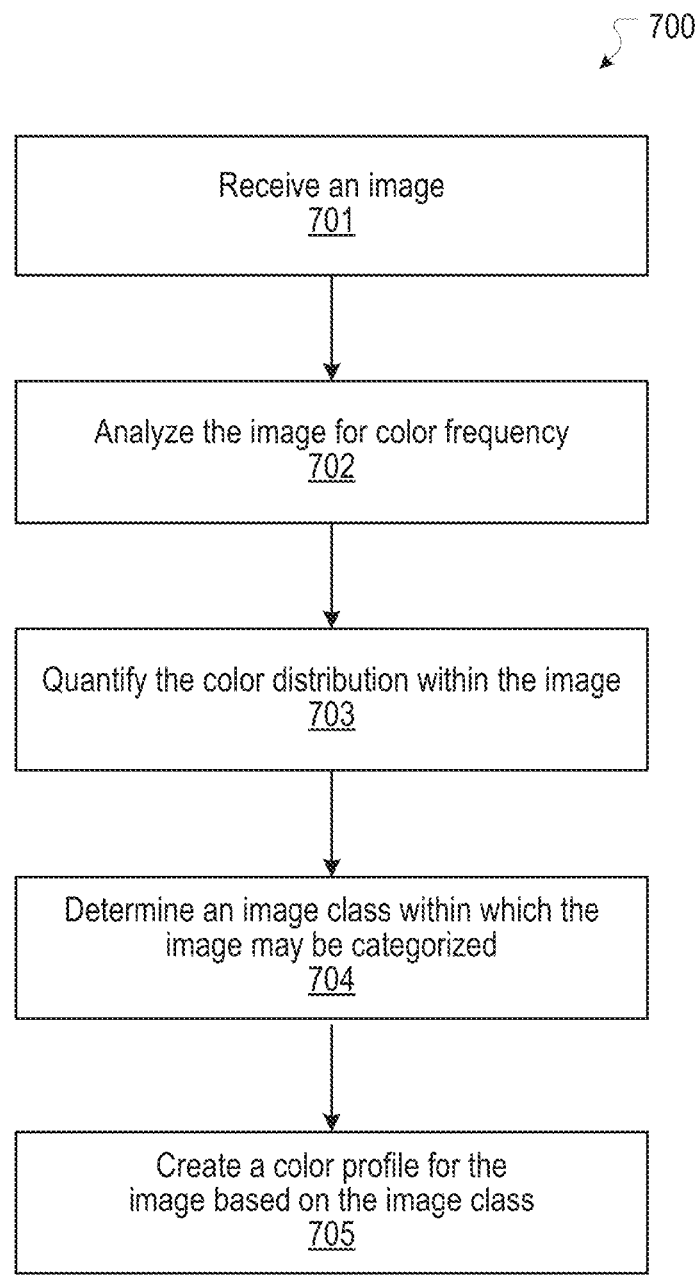
FIG. 7 illustrates a process for determining an image color profile based on an image class in accordance with an embodiment of the invention.

FIG. 7 illustrates a process 700 for determining an image color profile based on an image class in accordance with an embodiment of the invention. At block 701, the social networking system 130 receives an image. At block 702, the social networking system 130 analyzes the image and determines the frequency with which various colors occur. At block 703, the social networking system 130 quantifies the color distribution within the image. According to one embodiment, the social networking system 130 may quantify the color distribution by calculating the image histogram. Any technique for quantifying the color distribution within the image may be used. At block 704, the social networking system 130 determines an image class within which the image may be categorized. At block 705, the social networking system 130 creates a color profile for the image based on the determined image class. According to one embodiment, the social networking system 130 may copy the color profile associated with the image class. According to an embodiment, the process 700 may be entirely or partially performed by the image processing module 146 or other modules of the social networking system 130.

According to one embodiment of the invention, further efficiencies may be achieved by applying different weights to different parts of the image. For many images, the eyes of a viewer of the image focus on the center of the underlying scene portrayed in the image. The areas near the center of the image may be more important than the areas near the edges. Thus, according to one embodiment, the occurrence of a color within a particular area of the image is taken into account in determining the weight for the color. The weight may be determined exclusively, or partially, on the basis of the location of a pixel within the image. Alternatively, the weight may be determined for a color based on a combination of the occurrence of the color in the image as a whole and the distribution of the color across various parts of the image. In this embodiment, a color may not have a high occurrence in the image as a whole, but may have a high occurrence near the center of the image. The weight for that color may be selected to be similar to that of a color that occurs frequently in the image as a whole.

Figure 8:
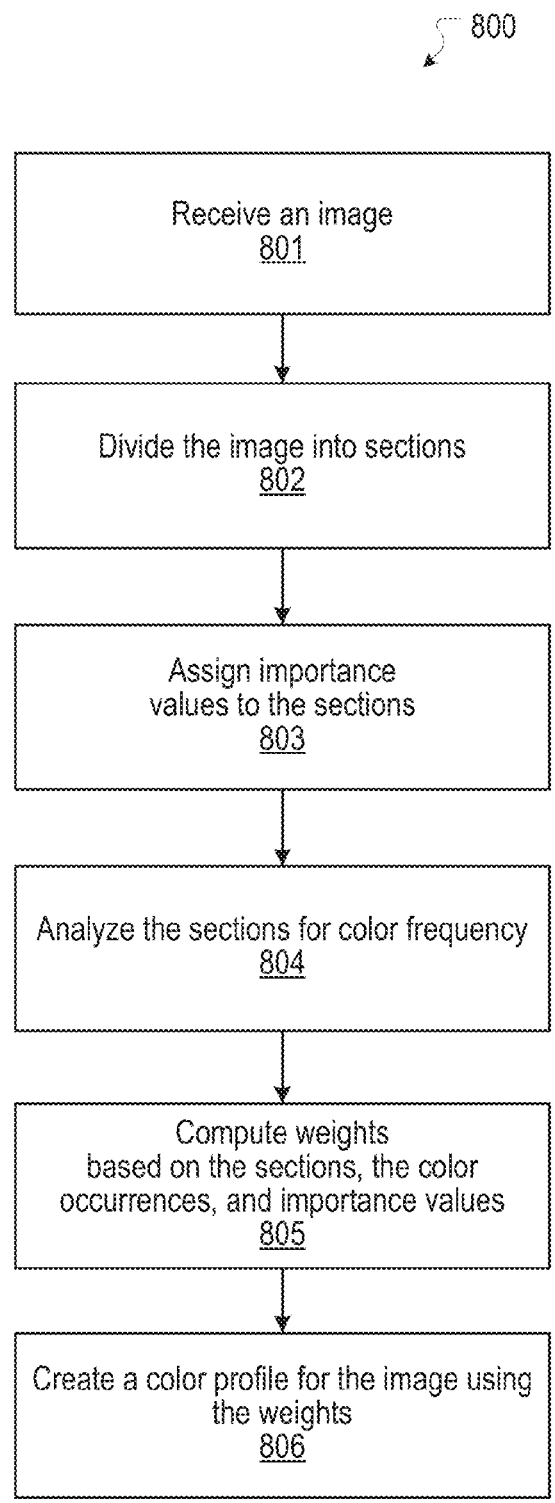
FIG. 8 illustrates a process for determining a color profile for an image based on the distribution of a color across different areas within the image in accordance with an embodiment of the invention.

FIG. 8 illustrates a process 800 for determining a color profile for an image based on the distribution of a color across different areas within the image in accordance with an embodiment of the invention. At block 801, the social networking system 130 receives an image. At block 802, the social networking system 130 divides the image into sections. This division may be performed based on a pre-existing template or based on the image dimensions. According to one embodiment, the social networking system 130 may analyze the image and perform the division based on the content and characteristics of the image. Any technique for dividing the image into sections may be used. At block 803, the social networking system 130 assigns importance values to the sections. According to one embodiment, the importance values may be assigned according to a set of standard rules and principles. For example, the sections that encompass areas near the center of the image may automatically be assigned higher importance values than the sections near the edges. According to another embodiment, the importance values may be assigned based on the content and characteristics of the image. For example, the social networking system 130 may be able to detect that the subject matter of the image is near an edge of the image rather than near the center and therefore assign a higher importance value to the section encompassing the area near the edge. Any technique for assigning importance values may be used.

At block 804, the social networking system 130 analyzes the sections for the frequency with which various colors occur in each section. According to one embodiment, the social networking system 130 counts the occurrences of each color within each section. Any technique for determining the frequency with which colors occur may be used. At block 805, the social networking system 130 computes weights based on the sections determined in block 802 and the importance values determined in block 803. According to one embodiment, the weights are proportional to the importance values assigned to the sections, such that a color that occurs frequently within a section that has been assigned a high importance value may have a relatively high weight. Similarly, a color that occurs frequently within the image as a whole but does not occur frequently within sections that have been assigned high importance values may have a relatively low weight. At block 806, the social networking system 130 creates a color profile for the image using the determined weights. According to one embodiment, the color profile may include control points of polyline segments that may be determined using the binary search and simulated annealing techniques described herein. Any technique for creating the color profile or determining the polyline segments may be used. According to an embodiment, the process 800 may be entirely or partially performed by the image processing module 146 or other modules of the social networking system 130.

According to an embodiment of the invention, another technique for balancing the need for color-specific error determinations with the need to ensure computational efficiency involves computing a weight for a block of colors rather than for each individual color. As described above, in many color spaces, a color may be modeled as a triplet of values between 0 and 255. However, triplet values in the same numerical range typically correspond to very similar colors. For example, in the RGB color space, the triplet [165, 42, 42] corresponds to brown. If any of the values are incremented by 1, the resulting color may be virtually indistinguishable from the brown color indicated by [165, 42, 42]. Thus, according to one embodiment, similar colors may be assigned the same weight.

According to another embodiment of the invention, the social networking system 130 may determine weights only for colors that appear within an image. A color space may have tens of millions of colors, most of which may not appear in an image. A color profile for the image may be created more efficiently by omitting those colors that do not appear within the image. In this embodiment, the social networking system 130 may analyze an image and determine a weight for each color corresponding to the frequency with which that color occurs within the image, as described above in reference to the process 600. The social networking system 130 may identify the colors whose weights are zero—i.e., the colors do not occur at all in the image—and omit those colors from the procedure for determining the error caused by a candidate, approximate profile compared to an ideal profile. Consequently, the resulting color profile is tuned to minimize approximation error only for those colors that actually appear in the image. This embodiment may be even more computationally efficient and result in a smaller color profile.

The embodiments described herein may be implemented to optimize the use of computing resources and minimize processing time. According to an embodiment, the transformation of each color in an image may be unrelated to the transformation of other colors in the image. Each color transformation may be executed in parallel. This parallel execution may be implemented by using multiple graphics processing units or multi-threading techniques. According to another embodiment, an ideal function curve may be computed once, cached, and re-used in subsequent computations. Caching the ideal function curve and retrieving it from the cache when it may be needed may eliminate repetitive or redundant calculations whose result may always be identical.

Hardware Implementation

Figure 9:
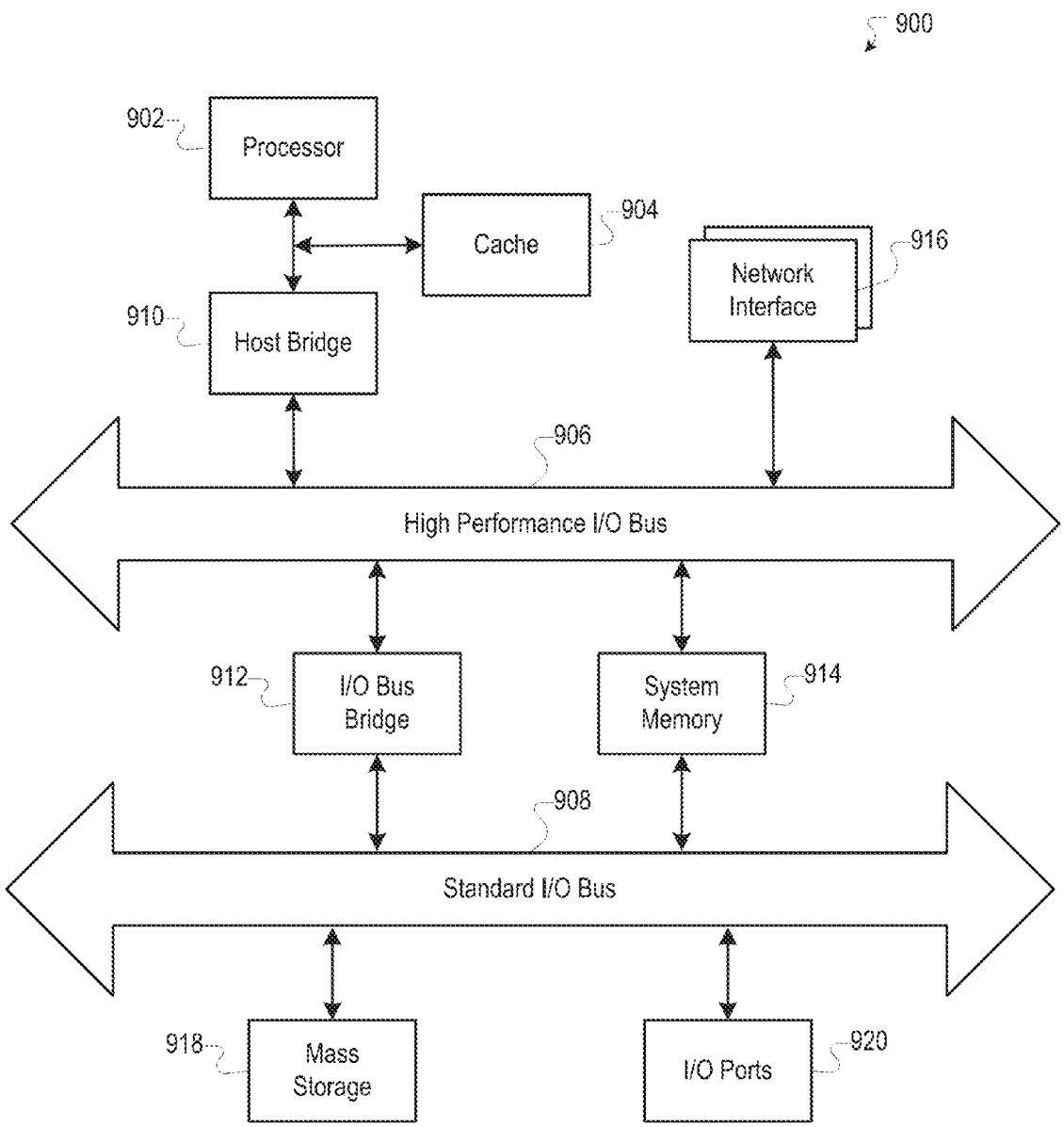
FIG. 9 illustrates an example of a computer system that may be used to implement one or more of the embodiments described herein in accordance with an embodiment of the invention.

The foregoing processes and features can be implemented by a wide variety of machine and computer system architectures and in a wide variety of network and computing environments. FIG. 9 illustrates an example of a computer system 900 that may be used to implement one or more of the computing devices identified above. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be the social networking system 130, the user device 110, and the external system 120, or a component thereof. In an embodiment of the invention, the computer system 900 may be one server among many that constitutes all or part of the social networking system 130.

The computer system 900 includes a processor 902, a cache 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to high performance I/O bus 906. The computer system 900 may further include video memory and a display device coupled to the video memory (not shown). Mass storage 918 and I/O ports 920 couple to the standard I/O bus 908. The computer system 900 may optionally include a keyboard and pointing device, a display device, or other input/output devices (not shown) coupled to the standard I/O bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by the processor 902.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A method comprising:
   by one or more computing devices, receiving an image that corresponds to a first color space; and
   by one or more computing devices, creating, based on an approximation function, a color profile for transforming the image from the first color space to a second color space, wherein:
   the approximation function is determined by a polyline;
   the polyline comprises a number of line segments;
   each of the line segments has one or more control points;
   the number of line segments is determined by a binary search algorithm;
   the control points for the line segments are determined by a simulated annealing algorithm; and
   the polyline as determined by the binary search algorithm and the simulated annealing algorithm is separated from an ideal function curve for transforming the image by an error value that is within a pre-determined threshold.

2. The method of claim 1, wherein the error value is calculated using an error metric for the color profile.

3. The method of claim 1, wherein the plurality of polyline segments approximate the ideal function curve.

4. The method of claim 3, wherein the control points lie on the ideal function curve.

5. The method of claim 3, wherein the control points do not lie on an ideal function curve.

6. The method of claim 2, wherein the determining the error metric comprises calculating a numerical difference between an ideal color and an approximate color.

7. The method of claim 2, wherein determining the error metric comprises calculating a Delta-E for an ideal color and an approximate color.

8. The method of claim 2, wherein determining the error metric comprises:
   determining a frequency with which a color occurs in the image;
   assigning a weight to the color based on the frequency; and
   calculating the error metric based on the weight.

9. The method of claim 2, wherein determining the error metric comprises:
   dividing the image into a plurality of sections;
   assigning a plurality of importance values to the plurality of sections; and
   calculating the error metric based on the plurality of importance values.

10. The method of claim 2, wherein determining the error metric comprises computing the error metric based on at least one color.

11. The method of claim 2, wherein determining the error metric comprises computing the error metric based on a plurality of colors.

12. The method of claim 11, wherein the plurality of colors are represented by consecutive bytes.

13. The method of claim 1, wherein the binary search algorithm comprises determining an upper bound and a lower bound for the binary search algorithm.

14. The method of claim 13, wherein an initial value for the binary search algorithm is the upper bound or the lower bound.

15. The method of claim 1, wherein the simulated annealing algorithm comprises determining coordinates for the control points.

16. The method of claim 15, wherein the coordinates minimize a distance between a polyline and an ideal function curve.

17. The method of claim 1, wherein the creating the color profile comprises omitting consideration of a color that does not appear in the image.

18. The method of claim 1, wherein the first color space comprises at least one of an RGB color space and an XYZ color space.

19. A system comprising:
   at least one processor; and
   a memory storing instructions configured to instruct the at least one processor to:

receive an image that corresponds to a first color space; and
create, based on an approximation function, a color profile for transforming the image from the first color space to a second color space, wherein:
the approximation function is determined by a polyline;
the polyline comprises a number of line segments;
each of the line segments has one or more control points;
the number of line segments is determined by a binary search algorithm;
the control points for the line segments are determined by a simulated annealing algorithm; and
the polyline as determined by the binary search algorithm and the simulated annealing algorithm is separated from an ideal function curve for transforming the image by an error value that is within a pre-determined threshold.

20. A non-transitory computer-readable storage medium storing computer-executable instructions that, when executed, cause a computer system to:
receive an image that corresponds to a first color space; and
create, based on an approximation function, a color profile for transforming the image from the first color space to a second color space, wherein:
the approximation function is determined by a polyline;
the polyline comprises a number of line segments;
each of the line segments has one or more control points;
the number of line segments is determined by a binary search algorithm;
the control points for the line segments are determined by a simulated annealing algorithm; and
the polyline as determined by the binary search algorithm and the simulated annealing algorithm is separated from an ideal function curve for transforming the image by an error value that is within a pre-determined threshold.

* * * * *